(12) United States Patent
Zhang

(10) Patent No.: US 12,543,660 B2
(45) Date of Patent: Feb. 10, 2026

(54) POLYMERIC FILM

(71) Applicant: AT FILMS, INC., Alberta (CA)

(72) Inventor: Xiaojiang Zhang, Alberta (CA)

(73) Assignee: AT Films, Inc., Edmonton (CA)

( * ) Notice: Subject to any disclaimer, the term of this patent is extended or adjusted under 35 U.S.C. 154(b) by 947 days.

(21) Appl. No.: 17/285,392

(22) PCT Filed: Oct. 8, 2019

(86) PCT No.: PCT/EP2019/077171
§ 371 (c)(1),
(2) Date: Apr. 14, 2021

(87) PCT Pub. No.: WO2020/078766
PCT Pub. Date: Apr. 23, 2020

(65) Prior Publication Data
US 2021/0337744 A1    Nov. 4, 2021

(30) Foreign Application Priority Data
Oct. 19, 2018   (CA) ..................................... 3021599

(51) Int. Cl.
*A01G 9/14*    (2006.01)
*B32B 27/08*   (2006.01)
(Continued)

(52) U.S. Cl.
CPC .......... *A01G 9/1438* (2013.01); *A01G 9/1415* (2013.01); *B32B 27/08* (2013.01);
(Continued)

(58) Field of Classification Search
CPC ...... A01G 9/1438; A01G 9/1407; A01G 9/24; A01G 9/1415; A01G 2009/1453;
(Continued)

(56) References Cited

U.S. PATENT DOCUMENTS

RE34,605 E  *  5/1994  Schrenk ................. G02B 5/282
                                                           359/359
2012/0047824 A1   3/2012  Chang
(Continued)

FOREIGN PATENT DOCUMENTS

JP         S5876031         5/1983
KR         20090085941      8/2009

OTHER PUBLICATIONS

Dagnelies, Joelle, "International Search Report and Written Opinion for International App No. PCT/EP2019/077171," European Searching Authority, Jul. 20, 2020.
(Continued)

*Primary Examiner* — Trinh T Nguyen
(74) *Attorney, Agent, or Firm* — Nicholas J. Landau; Maynard Nexsen PC

(57) ABSTRACT

The present disclosure provides a film for enhancing the growth of plants in the Cannabaceae family, the film being capable of blocking solar spectrum in the range 430-550 nm. The present disclosure also provides a single- or multi-layer plastic greenhouse film for enhancing cannabis plant growth, where the single- or multi-layer plastic greenhouse film (a) has at least one blue light blocking layer for blocking solar spectrum in the range of 430-500 nm; (b) has a high transmittance for red light in the solar spectrum in the range of 600-750 nm.

20 Claims, 1 Drawing Sheet

Figure 1:

(51) Int. Cl.
*B32B 27/20* (2006.01)
*B32B 27/32* (2006.01)
*G02B 5/22* (2006.01)

(52) U.S. Cl.
CPC .............. *B32B 27/20* (2013.01); *B32B 27/32* (2013.01); *G02B 5/22* (2013.01); *B32B 2250/05* (2013.01); *B32B 2250/242* (2013.01); *B32B 2307/42* (2013.01); *B32B 2410/00* (2013.01)

(58) Field of Classification Search
CPC .......... A01G 2009/1461; A01G 9/1469; A01G 9/242; A01G 9/241; A01G 13/0206; A01G 13/0212; A01G 13/0231; A01G 13/04; A01G 13/043; A01G 13/0275; A01G 13/0281
See application file for complete search history.

(56) References Cited

U.S. PATENT DOCUMENTS

| | | | |
|---|---|---|---|
| 2013/0097922 A1* | 4/2013 | Lempidakis | B32B 43/006 47/17 |
| 2014/0345195 A1* | 11/2014 | Velate | C09K 11/06 428/220 |
| 2016/0081281 A1* | 3/2016 | Horinek | A01G 9/1438 47/65.5 |
| 2019/0124864 A1* | 5/2019 | Bassin | A01H 6/28 |

OTHER PUBLICATIONS

International Preliminary report on patentability Chapter 1 for PCT/EP2019/077171 mailed on Apr. 29, 2021, 7 pages.

* cited by examiner

POLYMERIC FILM

CROSS-REFERENCE TO RELATED APPLICATIONS

This application is a national stage under 35 U.S.C. 371 of International Application No. PCT/EP2019/077171 having an international filing date of Oct. 8, 2019 (currently published), which claims priority to Canadian Patent Application No. 3021599 filed on Oct. 19, 2018.

The present invention relates to a polymeric film for modifying solar light and particularly, although not exclusively, to greenhouse and greenhouse-like structures which includes covering materials that protect plants from external climate conditions and diseases, create optimal growth microenvironments, and offer a flexible solution for sustainable and efficient year-round cultivation.

Glass and polycarbonate were traditionally utilised for such materials, but with advances in technology many types of flexible plastic materials, including copolymers such as polyethylene, poly (ethylene-vinyl acetate) and polycarbonate, have become popular.

Produced with co-extrusion technology, flexible plastic films can be tailored specifically to the unique light and temperature requirements of many field-grown plants including flowers, fruits and vegetables. At the same time, plastic films can help to reduce water consumption by reducing evaporation.

Most greenhouse polyethylene plastic films contain ultraviolet (UV) light-protection components added to prolong the life of the material and maintain high levels of transmission of photosynthetically active radiation (PAR). The commonly used UV protection chemicals include UV absorber or blocker and light stabiliser.

Some aspects and embodiments of the present invention relate generally to a polymeric film and method for enhancing growth of plants in the Cannabaceae family of plant, for example through blending a blue light blocker or absorber in the film structure to partially block natural sunlight with wavelengths range from 430 nm or 440 nm to 490 nm or 500 nm.

Cannabis is a genus of flowering plants in the Cannabaceae family. Some embodiments relate to improvements in or relating to the growth of Cannabis plants (for example C. sativa, C. indica and C. ruderalis).

The Cannabiaceae (Cannabidaceae) is a family of dicotyledonous plants that contains only two genera: Humulus; and Cannabis. Humulus lupulus (hop) is a perennial climbing herb widely cultivated for its inflorescences, used to flavour beer. Cannabis sativa (hemp) is cultivated in temperate and tropical regions for its fibre, and for the drug contained in its resin. Cannabinoids are a chemically diverse class of chemicals that activate cannabinoid receptors. They include endocannabinoids produced by the body and the group of C21 compounds typical of and present in Cannabis sativa. It includes their carboxylic acids, analogs, and transformation products. Currently, 61 different cannabinoids have been identified in Cannabis, and, as yet, none have been isolated from any other plant or animal species.

Some embodiments relate to a polymeric greenhouse film for enhancing cannabis plant crop yield and speed up growth of cannabis plants.

Aspects and embodiments of the present invention may be provided or relate to a general increase in one or more useful/active compounds/components, such as cannabidiol (CBD) and/or tetrahydrocannabinol (THC).

The present invention may also provide products manufactured with products and/or bi-products of plants grown under films as described herein, for example, oils, edibles, tinctures, capsules.

The present invention may also provide plants grown under films as described herein.

The present invention also provides a tetrahydrocannabinol enhancing polymeric film.

The present invention also provides a Cannabaceae growth-enhancing polymeric film comprising, consisting of or including a film as described herein.

The present disclosure provides a film for enhancing the growth of plants in the Cannabaceae family, the film being capable of blocking solar spectrum generally in the range of approximately 440-550 nm or 430-550 nm.

The present disclosure also provides a single- or multi-layer plastic greenhouse film for enhancing cannabis plant growth, where the single- or multi-layer plastic greenhouse film (a) has at least one blue light blocking layer for blocking solar spectrum in the range of 430-500 nm, 430-490 nm, 440-490 nm or 440-500 nm; (b) has a high transmittance for red light in the solar spectrum in the range of 600-750 nm.

The film may promote cannabis plant growth in terms of, for example, accelerating the growth period (e.g. faster flowering period), promoting bigger and more dense flowers, or producing higher tetrahydrocannabinol (THC) concentration.

The key elements of some polymeric greenhouse films comprise a blue light blocker or absorber which is capable of reducing the intensity of natural sunlight in the blue light range from 440 nm to 500 nm, UV light protection components which protect said greenhouse films from UV degradation, a polymeric film base structure comprising polyethylene and/or EVA, and fillers comprising light diffuser and processing aids. The blue light blocker or absorber blended in said polymeric film, being capable of blocking light with wavelength ranges from 430 or 440 nm to 490 or 500 nm, provides a unique light source for growing cannabis.

Some aspects and embodiments are configured to enhance growth of Cannabis plants with the aim of producing more cannabinoids, for example THC, per plant or per weight. THC is the principal psychoactive constituent of Cannabis.

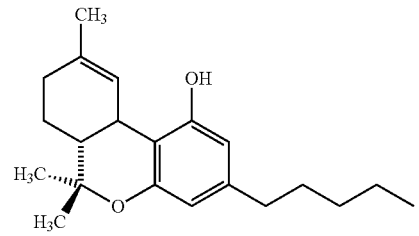

The present invention provides a polymer film for modifying solar light, the film being capable of at least partially blocking the solar spectrum up to and/or within a wavelength and/or wavelength band in the 430-490 nm, 440-490 nm, 430-500 nm or 440-500 nm blue range.

The present invention provides a greenhouse film that is capable of at least partially blocking the solar spectrum up to a wavelength in the 430-490 nm, 440-490 nm, 430-500 nm or 440-500 nm blue range.

The present invention also provides a greenhouse film that is capable of at least partly blocking the region of the solar spectrum around and/or up to a wavelength in the range 430-490 nm, 440-490 nm, 430-500 nm or 440-500 nm.

The present invention also provides a polyethylene-based multilayer greenhouse film that is capable of blocking the, for example, 430-490 nm, 440-490 nm, 430-500 nm, 440-500 nm or 430-500 nm in the blue region of the solar spectrum.

The present invention also provides a blue light-blocking film for enhancing cannabis plant growth which absorbs blue light around and/or up to approximately: 430 nm, 440 nm, 450 nm, 460 nm, 470 nm, 480 nm, 490 nm, and 500 nm.

The present invention also provides a greenhouse film having an orange colour that is capable of at least partly blocking the region of the solar spectrum around and/or up to a wavelength in the range 430-490 nm, 440-490 nm, 430-500 nm or 440-500 nm.

The present invention also provides a greenhouse film having an orange colour that is capable of at least partially blocking the solar spectrum up to a wavelength in the range 430-490 nm, 440-490 nm, 430-500 nm or 440-500 nm.

The present invention also provides a polyethylene-based multilayer greenhouse film having an orange colour that is capable of blocking the 430-490 nm, 440-490 nm, 430-500 nm or 440-500 nm region of the solar spectrum.

The present invention also provides a blue light-blocking film which absorbs the blue light in the solar radiation around and/or up to approximately: 430 nm, 440 nm, 450 nm, 460 nm, 470 nm, 480 nm, 490 nm, 495 nm or 500 nm.

In some aspects and embodiments the film blocks all, substantially all, a majority or a significant amount of blue light wavelengths up to and including about 430 nm, 440 nm, 450 nm, 460 nm, 470 nm, 480 nm, 490 nm, 495 nm or 500 nm.

The present invention may provide a multilayer polymer film for modifying solar blue light.

In some aspects and embodiments blue light is defined as a range of the visible light spectrum, defined as having a wavelength between about 400-495 nm. Blue light blockers used in accordance with the present invention therefore be selected for adsorption/absorption in this range.

Blue light blockers used in aspects and embodiments of the present invention may be selected on this basis of one or more of: (a) compatibility, desirably miscibility, and preferably solubility of the colorant in the thermoplastic polymer in order to maximize transmittance and retain maximum clarity at those wavelength regions other than blue light; (b) considerable absorption (e.g. 100%, 90%, 80%, 70%, 60%, 50%, 40%, 30% or 20% absorption) of blue light in the wavelength region of, for example, about 430-450 nm; and (c) minimal absorption (e.g. only 20%, 10% or 0% absorption) of light in the wavelength region of greater than 450 nm, especially greater than, for example, 560 nm.

A person having ordinary skill in the art, based on the examples herein, can tailor the amount of blue light transmittance in the wavelength region of about 430-450 nm, 430-490 nm, 440-490 nm, 430-500 nm or 440-500 nm to be any amount from, for example, about 0% to as much as about 80% and any percentage in between those extremes.

The blue light blocker may be yellow or orange in colour.

Examples of suppliers of suitable blue block masterbatches include Ampacet and PolyOne.

In some embodiments the film blocks all blue wavelengths up to and including 430 nm, 440 nm, 450 nm, 460 nm, 470 nm, 480 nm, 490 nm, or 500 nm. In other embodiments a specific band of blue wavelengths is blocked.

In some embodiments additives are provided so that the film is configured to absorb the blue light (e.g. 430-490 nm, 440-490 nm, 430-500 nm or 440-500 nm) of the spectrum.

The present invention also provides a polyethylene based multilayer greenhouse film that is capable of blocking the, for example, 430-490 nm, 440-490 nm, 430-500 nm or 440-500 nm region of the solar spectrum.

In some aspects and embodiments the present invention provides a polyethylene based multilayer greenhouse film that is capable of blocking at least the, for example, 430-450 nm, 430-490 nm, 440-490 nm, 430-500 nm or 440-500 nm region of the solar spectrum by 20-100%.

The film may be a monolayer or a multi-layer.

In some embodiments the film has multilayer structure. The light modifier or blocker will be added to at least one layer.

In some embodiments the film is still a functional greenhouse film. Adding a blue light modifier will reduce the PAR light transmittance (which is a critical property for greenhouse film). In some embodiments the film has an overall light transmittance greater than 60%.

In some embodiments the film has an overall 600-750 nm red light transmittance larger than 80%.

In some embodiments the film will also pass certain physical standards as a greenhouse film, including tear resistance, puncture resistance, elongation, etc.

In some aspects and embodiments UV absorbers are provided and in addition one or more pigments are provided.

Different aspects and embodiments can be used together or separately.

Embodiments of the present invention are more particularly described, by way of non-limiting example, below.

The example embodiments are shown in sufficient detail to enable those of ordinary skill in the art to embody and implement the systems and processes herein described. It is important to understand that embodiments can be provided in many alternate forms and should not be construed as limited to the examples set forth herein.

Embodiments can be modified in various ways and take on various alternative forms. There is no intent to limit to the particular forms disclosed. On the contrary, all modifications, equivalents, and alternatives falling within the scope of the appended claims should be included.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

One of ordinary skill in the art will appreciate the many possible applications and variations of the present invention based on the following examples of possible embodiments of the present invention.

EXAMPLES

Example 1

Structure of a 7-layer blue light blocking film for enhancing cannabis growth:

| Layer # | Layer % | Main Ingredients |
| --- | --- | --- |
| 1 inner | 19 | polyethylene blend; UV light inhibitor |
| 2 | 22 | polyethylene blend; blue light blocking additive; UV light inhibitor |

-continued

| Layer # | Layer % | Main Ingredients |
|---|---|---|
| 3 | 8.5 | polyethylene blend; UV light inhibitor |
| 4 | 3 | polyethylene blend; UV light inhibitor |
| 5 | 8.5 | polyethylene blend; UV light inhibitor |
| 6 | 20 | polyethylene blend; blue light blocking additive; UV light inhibitor |
| 7 outer | 19 | polyethylene blend; UV light inhibitor |

Example 2

Structure of a diffused 7-layer blue light blocking film for enhancing cannabis growth:

| Layer # | Layer % | Main Ingredients |
|---|---|---|
| 1 inner | 20 | polyethylene blend; UV light inhibitor; light diffuser |
| 2 | 20 | polyethylene blend; blue light blocking additive; UV light inhibitor |
| 3 | 8 | polyethylene blend; UV light inhibitor; light diffuser |
| 4 | 4 | polyethylene blend; UV light inhibitor |
| 5 | 8 | polyethylene blend; UV light inhibitor; light diffuser |
| 6 | 20 | polyethylene blend; blue light blocking additive; UV light inhibitor |
| 7 outer | 20 | polyethylene blend; UV light inhibitor; light diffuser |

Example 3

A 150 um thick 7-layer polyethylene-based orange greenhouse film having two layers containing blue light blocker is used to grow cannabis plants. The overall PAR light transmission of the film is 70%. The overall 430-500 nm blue light transmission is 50%. The overall 600-750 nm red light transmission of the film is 95%. Cannabis plants are grown at a controlled temperature ranging from 23 to 30 degree Celsius. The greenhouse has 12-hour per day sunlight following a 12-hour per day total black out. Cannabis plants grown using this film reach maturity much faster than control plants and produce more THC per plant or per weight.

Example 4

A 152.4 um thick 5-layer polyethylene-based orange greenhouse film having three layers containing blue light blocker is used to grow cannabis plants. The overall PAR light transmission of the film is 68%. The overall 430-500 nm blue light transmission is 40%. The overall 600-750 nm red light transmission of the film is 90%. The greenhouse film has a light diffusion rate of 65%. Cannabis plants are grown at a controlled temperature ranging from 25 to 28 degree Celsius. The greenhouse has 14-hour per day sunlight following a 10-hour per day total black out. Cannabis plants grown using this film reach maturity much faster than control plants and produce more THC per plant or per weight.

Example Trial Results

FIG. 1 shows a greenhouse using a blue blocking film formed in accordance with the present invention.

Figure 2:

Referring also to FIG. 2, general observations about the blue blocking film: the flowering period was much quicker than observed with a standard clear polyethylene film used for comparison. The flowering period was 6.5 to 7.5 weeks compared to 8 to 9 weeks with standard film (about 18-20% shorter). The flowers are much harder and denser; one could say they appeared to be more "finished". Also there is visibly much more trichome and resin production.

In this embodiment the film is a 7-layer co-extruded film made of polyethylene where the blue light blocker is added into four layers (layers 2, 3, 5 and 6 in this embodiment; in another embodiment it is, for example, added into two layers: 2 and 6). The film used is formed generally in accordance with the following recipe:

| Layer 1 | 19% |
|---|---|
| Description | % |
| LDPE | 15.00 |
| LLDPE | 71.00 |
| UV master batch | 9.00 |
| Slip master batch | 4.00 |
| Process aid master batch | 1.00 |

| Layer 2 | 22% |
|---|---|
| Description | % |
| LLDPE | 88.50 |
| UV master batch | 9.00 |
| Blue block master batch | 2.50 |

| Layer 3 | 8.5% |
|---|---|
| Description | % |
| LDPE | 68.50 |
| LLDPE | 20.00 |
| UV master batch | 9.00 |
| Blue block master batch | 2.50 |

| Layer 4 | 3% |
|---|---|
| Description | % |
| LDPE | 71.00 |
| LLDPE | 20.00 |
| UV master batch | 9.00 |

| Layer 5 | 8.5% |
|---|---|
| Description | % |
| LDPE | 68.50 |
| LLDPE | 20.00 |
| UV master batch | 9.00 |
| Blue block master batch | 2.50 |

| Layer 6 | 20% |
|---|---|
| Description | % |
| LLDPE | 88.50 |
| UV master batch | 9.00 |
| Blue block master batch | 2.50 |

| Layer 7 Description | 19% % |
|---|---|
| LDPE | 71.00 |
| LLDPE | 15.00 |
| UV master batch | 9.00 |
| Slip master batch | 4.00 |
| Process aid master batch | 1.00 |

In this embodiment slip agent and process aid (PPA: polymer processing aid) are added only to layers 1 and 7.

The UV masterbatch may be a UV absorbing and/or UV stabilising masterbatch.

An example of blue light block is produced by Ampacet.

The use of slip agents for polyethylene films reduces the Friction Coefficient (COF) while maintaining optic properties such as brilliance, transparency, and clarity. They may also be used jointly with "anti-block" agents.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A multi-layer plastic greenhouse film for enhancing cannabis plant growth, comprising a first blue light blocking layer for blocking solar spectrum in the range of 430-500 nm and a second blue light blocking layer for blocking solar spectrum in the range of 430-500 nm and comprising at least one intermediate layer between the first and second blue light blocking layers; wherein the film has a high transmittance for red light in the solar spectrum in the range of 600-750 nm; wherein each blue light blocking layer comprises a blue light blocking additive.

2. The film of claim 1, wherein each of said blue light blocking layers is capable of at least partly blocking the region of the solar spectrum around and/or up to a wavelength in the range 430-490 nm, 440-490 nm, 430-500 nm or 440-500 nm.

3. The film of claim 1, wherein each of said blue light blocking layers is capable of at least partially blocking the solar spectrum up to a wavelength in the range 430-500 nm.

4. The film of claim 1, wherein each of said blue light blocking layers is capable of blocking the intensity of 430-500 nm region of the solar spectrum by 20-40%.

5. The film of claim 1, wherein each of said blue light blocking layers is capable of blocking the intensity of 430-500 nm region of the solar spectrum by 40-60%.

6. The film of claim 1, wherein each of said blue light blocking layers is capable of blocking the intensity of 430-500 nm region of the solar spectrum by 60-100% or by 80-100%.

7. The film of claim 1, wherein each of said blue light blocking layers absorbs the blue light in the solar radiation around and/or up to approximately: 430 nm, 440 nm, 450 nm, 460 nm, 470 nm, 480 nm, 490 nm, or 500 nm.

8. The film of claim 1, wherein each of said blue light blocking layers blocks all blue light wavelengths up to and including 430 nm, 440 nm, 450 nm, 460 nm 470 nm, 480 nm, 490 nm, or 500 nm.

9. The film of claim 1, wherein said film has a transmittance of 75%-100% for red light in the solar spectrum.

10. The film of claim 1, wherein said film has an overall transmittance for red light in the solar spectrum at 60-80% or larger than 80%.

11. The film of claim 1, in which the film is formed using blow extrusion technology.

12. The film of claim 1, in which the film is formed using cast extrusion technology.

13. The film of claim 1, in which at least one of the layers of the film comprises: polyethylene, poly ethylene-vinyl acetate, polypropylene, or polyamide.

14. The film of claim 2, comprising one or more of: UV absorber additives; one or more pigment additives; an anti-fogging agent; an infrared blocker.

15. The film of claim 1, comprising one or more UV absorber additives that are capable of blocking 250-400 nm and one or more pigment additives.

16. The film of claim 1, comprising one or more UV absorber additives and one or more orange pigment additives.

17. The film of claim 1, comprising one or more UV absorber additives and one or more yellow pigment additives.

18. The film of claim 1, in which the film comprises an additive for modifying the transmitted light spectrum.

19. The film of claim 1, in which the film comprises an additive for blocking the transmitted light spectrum.

20. A film according to claim 1, wherein the further polymeric layer comprises a blue light blocker, a UV light blocker, a slip agent, or a combination of two or more of the foregoing.

* * * * *